Sept. 5, 1967 V. SPENCER 3,339,521
APPARATUS FOR MAKING SHEET MATERIAL
Filed Dec. 23, 1964 3 Sheets-Sheet 1
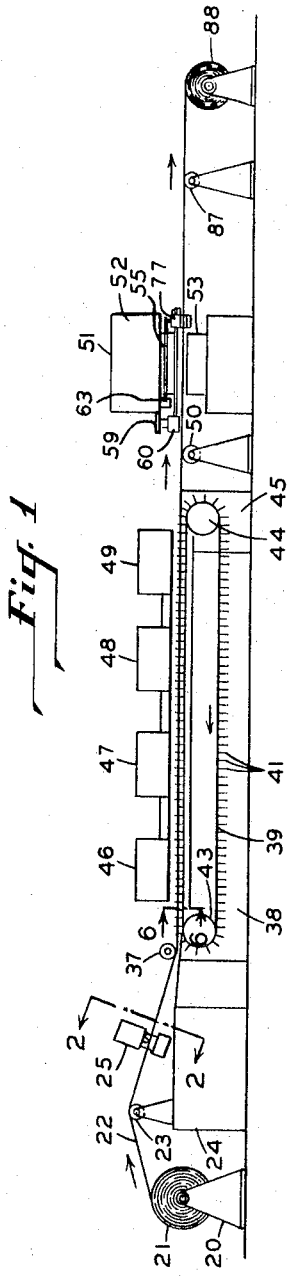
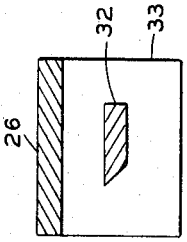
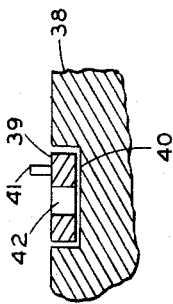
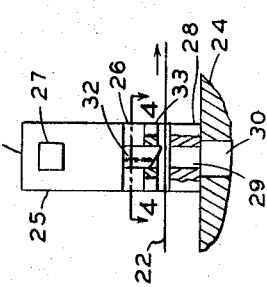
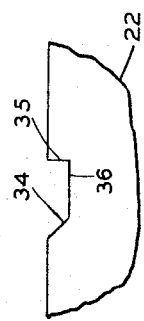
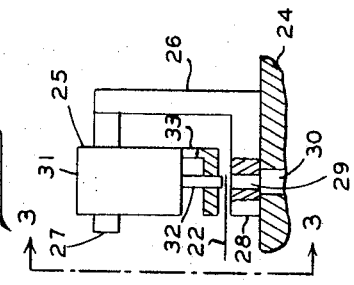
INVENTOR
VIRGIL SPENCER
BY *Stephen L. Hursting*
ATTORNEY

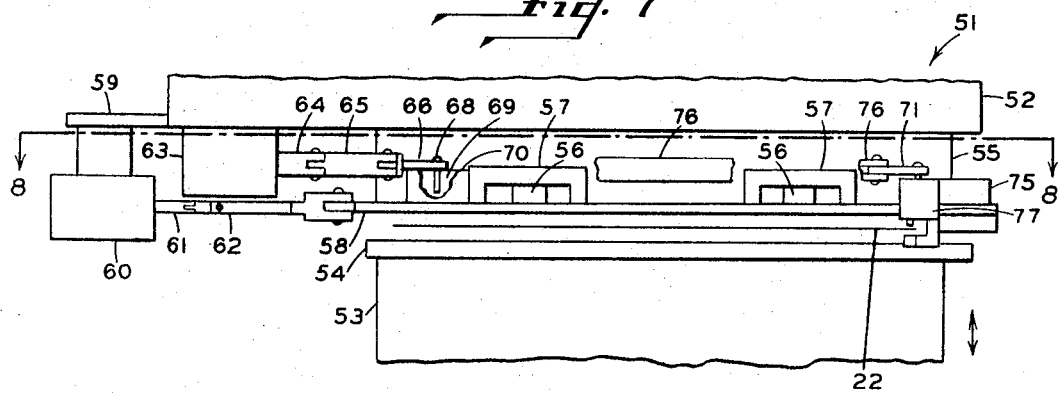
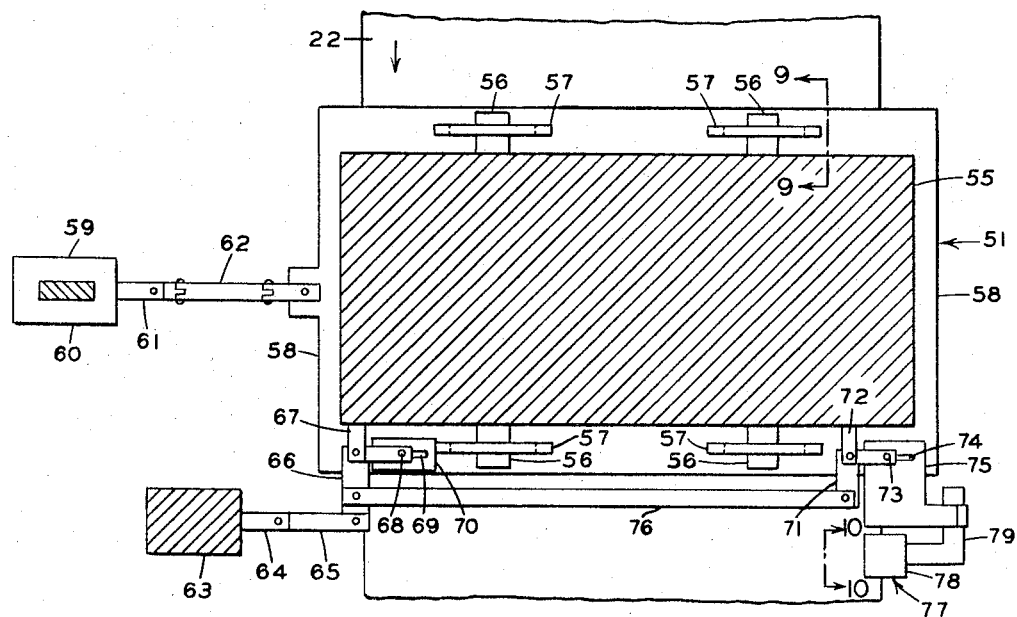
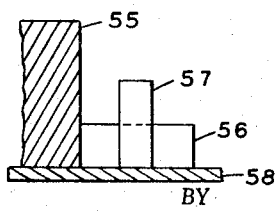
INVENTOR
VIRGIL SPENCER
ATTORNEY

Sept. 5, 1967          V. SPENCER          3,339,521
APPARATUS FOR MAKING SHEET MATERIAL
Filed Dec. 23, 1964                            3 Sheets-Sheet 3
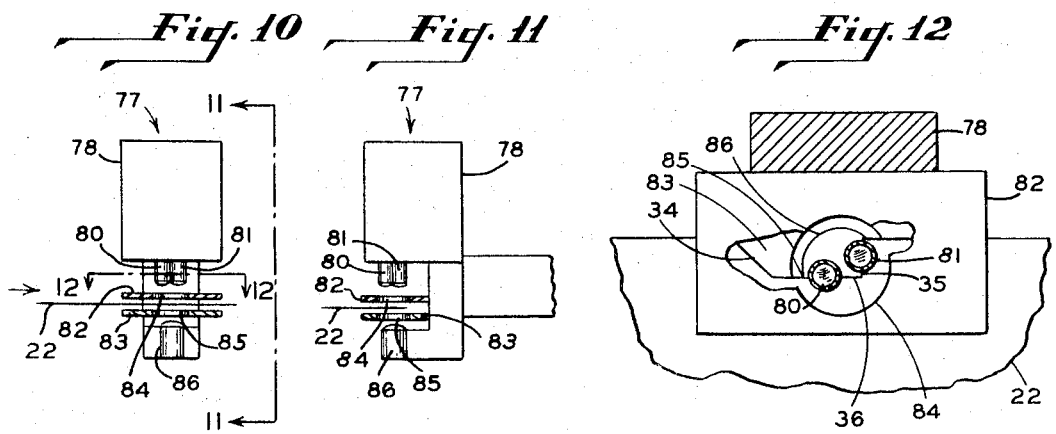
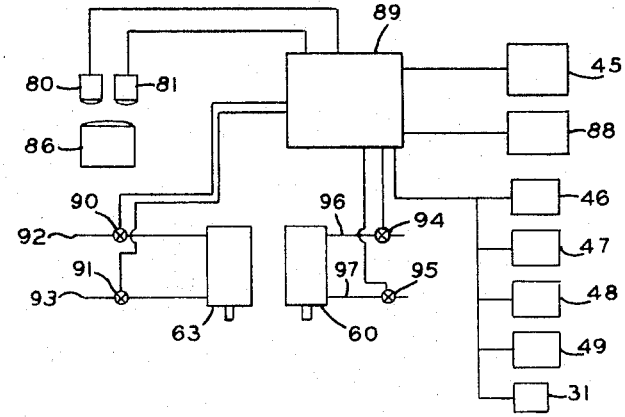
INVENTOR
VIRGIL SPENCER
BY *Stephen S. Kusting*
ATTORNEY United States Patent Office 3,339,521
Patented Sept. 5, 1967

3,339,521
APPARATUS FOR MAKING SHEET MATERIAL
Virgil Spencer, Lancaster County, Pa., assignor to Armstrong Cork Company, Lancaster, Pa., a corporation of Pennsylvania
Filed Dec. 23, 1964, Ser. No. 420,735
7 Claims. (Cl. 118—4)

This invention relates to an apparatus for making sheet material and particularly, to an apparatus for placing a properly registered, embossed design on sheet material.

In the manufacture of sheet material such as floor and wall coverings, for example, it has been the practice to place a design or pattern of multi-colored, granular composition upon a backing sheet. The granular composition is fusible in nature. When the granular composition and backing sheet are subjected to heat and pressure, said granular composition will be fused and secured to the backing material.

In many cases, it was found desirable to emboss the fused granular composition forming the design on the sheet material. It was found that the most attractive sheet material was obtained when the embossing pattern was the same as and properly registered with the design in the fused material. In these cases, proper registration was a necessity, and many problems were encountered in this regard.

The embossing operation was performed subsequent to the fusing or consolidation step. At least two presses were used to perform these operations. The fusing or consolidation step was performed in the first press, and the embossing was performed in the second press. The sheet material was visually and manually aligned with appropriate guide mechanisms prior to being embossed in the second press. Such aligning was necessary, since the embossing head and press bed were fixed and were not adjustable with respect to each other or to the sheet passing therethrough during normal operation.

The manual aligning operation mentioned above was time consuming and inefficient since the accuracy of alignment was dependent upon the skill and vision of the individual operator. As might be expected, consistently accurate registration under these circumstances was difficult to obtain.

It should be noted at this point that the above-described operations were intermittent in nature due to the intermittent operation of the granular composition design-creating apparatus. In other words, the sheet material was moved through the entire operation including the pressing in an intermittent fashion. The presses usually were of the reciprocating type.

The apparatus of the present invention eliminates the manual aligning step along with its attendant difficulties by providing automatic registration means. The apparatus of the present invention eliminates the need for separate consolidating and embossing presses by providing a single consolidating press having an adjustably mounted embossing head which may be moved into position to properly register with the design on sheet material. Sensing, control, and embossing head moving means are provided to properly locate the embossing head with respect to the pattern on the sheet material.

An object of the present invention is to provide improved apparatus for making sheet material.

Another object of the present invention is to provide automatic registration control means for an embossing operation.

Other objects of the present invention will be apparent from a description thereof with reference to the drawings wherein:

FIGURE 1 is a schematic view in elevation of apparatus for making sheet material according to the present invention;

FIGURE 2 is an enlarged view in elevation with portions broken away of apparatus for providing sheet material with references taken along line 2—2 in FIGURE 1;

FIGURE 3 is a side view in elevation with portions broken away of the apparatus shown in FIGURE 2 taken along line 3—3 therein;

FIGURE 4 is an enlarged, sectional view of the apparatus shown in FIGURE 3 taken along line 4—4 therein;

FIGURE 5 is a plan view of sheet material having references therein which were imparted by the apparatus shown in FIGURES 2 to 4;

FIGURE 6 is an enlarged, partial view in elevation of a pinned guide band and its associated guide groove taken along line 6—6 in FIGURE 1;

FIGURE 7 is an enlarged partial view in elevation with portions broken away of an embossing press having an adjustable embossing plate and suitable control apparatus therefor;

FIGURE 8 is a sectional view of the apparatus shown in FIGURE 7 taken along line 8—8 therein;

FIGURE 9 is an enlarged view in elevation with portions broken away of one of the support mechanisms for the embossing plate taken along line 9—9 in FIGURE 8;

FIGURE 10 is an enlarged view in elevation of registration sensing means;

FIGURE 11 is a side view in elevation with portions broken away of the apparatus shown in FIGURE 10 taken along line 11—11 therein;

FIGURE 12 is an enlarged sectional view of the apparatus shown in FIGURE 10 taken along line 12—12 therein; and FIGURE 13 is a schematic view of a control circuit which may be used with the apparatus of FIGURES 1 to 12.

Referring now to FIGURE 1, there is shown an unwind stand 20 which rotatably supports in suitable bearings a roll 21 of sheet material 22. Sheet material 22 passes over idler roller 23 which is suitably supported upon base 24.

After passing over idler roller 23, sheet material 22 next passes through punch mechanism 25 which is also mounted on base 24. Punch mechanism 25 has a support frame 26 with outwardly extending upper and lower portions 27 and 28, respectively. Lower portion 28 has a passage 29 therein. Lower portion 28 is located so that bore 29 communicates with a passage 30 in base 24. A suitable receptacle may be positioned below passage 30. Upper portion 27 supports head 31. Punch 32 depends from and is reciprocatingly supported by head 31. Guide 33 depends from head 31 and surrounds punch 32. Head 31 contains suitable actuating means such as a piston or solenoid, for example, which are connected to punch 32 to operate it in a vertically reciprocating manner. The shape of passage 29 is correspondingly similar to that of punch 32. Thus, passage 29 operates as a die.

As is apparent from FIGURES 2 to 4, when sheet material 22 underlies punch 32 and said punch is operated, a correspondingly shaped portion will be punched from sheet material 22. Punch mechanism 25 is usually located so that punch 32 will create a recess in the edge of sheet 22. Recess 34 may have a leading edge 35 which is transverse to the direction of movement of the sheet material, and a side edge 36 which is parallel to the direction of movement of the sheet material, as shown in FIGURE 5. Leading edge 35 forms a lateral reference line and side edge 36 forms a longitudinal reference line with respect to sheet material 22. It is to be understood that punch mechanism 25 is adjustable so that the position of the punched out portion with respect to the sheet material 22 may be varied. Instead of being a recess, in the edge of the sheet material, the aperture remaining in the sheet material after the punching operation may lie interiorly thereof.

After passing through punch mechanism 25 sheet material 22 extends under idler roller 37 which is mounted upon base 38. A pair of spaced, parallel guide bands 39 extend along associated guide grooves 40 in base 38 on opposite sides thereof. See FIGURE 6. Each band 39 has a plurality of spaced pins 41 extending upwardly therefrom. Each band contains a plurality of closely spaced, aligned perforations 42 which are engageable with spaced sprockets 43 and 44. Sprocket 44 may be connected to suitable drive means 45. Drive means 45 serve to intermittently and simultaneously move each band 39 a given distance along base 38 in the direction indicated by the arrows shown in FIGURE 1. After sheet material 22 passes under roller 37 it is engaged along opposite edges by pins 41 of bands 39 which pierce said sheet material 22. Thus, sheet material 22 will be positively pulled in an intermittent manner across base 38 by movement of pins 41 and bands 39 in the direction of the arrows. The length of each move is accurately controlled by drive means 45. Alignment of the sheet material 22 on base 38 is maintained by guide grooves 40, bands 39, and pins 41. It is to be understood that the length of movement of the sheet material is variable by suitable adjustment of drive means 45.

Overlying sheet material 22 on base 38 are a series of automatic stencils 46 to 49. Stencils 46 to 49 each contain a quantity of fusible, granular material which is deposited on the upper surface of sheet material 22 at given intervals when said stencils are actuated between the intermittent moves of sheet material 22. Each of the stencils 46 to 49 may have openings therein which are complementary to the openings in the remainder of the stencils. In this manner, each of the stencils 46 to 49 may contain fusible material of the same or different colors. When the stencils 46 to 49 are actuated to deposit fusible material upon sheet material 22, a desired design or pattern may be produced. In other words, the stencils will deposit small piles of fusible material on sheet material 22 each time they are actuated. The number of stencils used in any given situation is variable, depending upon pattern or design which is required. More or less stencils may be used depending upon the circumstances. The stencils are set up to produce repeating patterns on the set material. In any event, it is apparent that the sheet material 22 should not be moving during the time when the stencils 46 to 49 are depositing the fusible material on sheet material 22. The spacing between stencils 46 to 49 may be varied to properly position them with respect to the sheet material 22 so that after each movement thereof, each stencil will deposit its granular material in the proper spot on said sheet material 22. The length of movement of the sheet material 22 may also be varied to obtain a proper pattern of granular material thereon. It is to be understood that means other than stencils may be used to deposit material or otherwise create designs on sheet material 22.

It should be noted that punch mechanism 25 is actuated between each move of the sheet material 22 by control means to be described below to punch out a portion of said sheet material 22 thereby creating a plurality of sets of spaced, lateral and longitudinal reference lines in said sheet material 22. Once the positions of the stencils 46 to 49 and the length of movement of the sheet material 22 are fixed for a given pattern, each set of reference edges will bear a predetermined relationship to the stenciled pattern on the sheet material as long as said sheet material is kept in a taut condition between roll 21 and the point at which the pins 41 engage the sheet material 22. This is because pins 41 and bands 39 maintain sheet material 22 and the stenciled pattern of granular composition thereon in properly registered relationship throughout the length of base 38.

Subsequent to the stencil operation, sheet material 22 will be disengaged from pins 41 and will pass over idler roller 50 and into consolidating and embossing press 51. The pins 41 must be removed prior to entry of the sheet material 22 into press 51 to avoid damage to the pins 41 and the press 51. However, during the time that the unpinned sheet material is passing to the press 51 it may become misaligned with the embossing mechanism in said press 51. Therefore, an adjustable embossing mechanism and associated control means have been provided to align properly the embossing mechanism with respect to the pattern in the sheet material prior to the embossing and consolidating operation.

In FIGURES 7 to 9, the details of the adjustable embossing plate and its associated control mechanism are shown. Press 51 has an upper stationary portion 52 and a lower, opposed, vertically reciprocable portion 53. Lower portion 53 has press plate 54 mounted thereon. Sheet material 22 passes over press plate 54. Heating means are usually provided in portion 53 to heat plate 54.

Depending from upper portion 52 is support block 55. Support block 55 has two spaced, parallel pairs of opposed tongues 56 extending outwardly therefrom. C-shaped loops 57 extend over tongues 56. Each tongue 56 has one loop 57 passing thereover. The inside dimensions of the loops 57 are greater than the lateral dimension of the tongues 56, thereby providing space for movement of the tongues 56 within the loops 57. Loops 57 are secured at their outer ends to embossing plate 58. Therefore, it is apparent that plate 58 is adjustable in all directions within the limits allowed by tongues 56, loops 57, and block 55. The amount of adjustability, of course, will depend upon the dimensions of the aforementioned elements and the clearance therebetween. Heating means are usually provided in block 55 to heat plate 58.

Support frame 59 is secured to upper portion 52 of press 51. Fluid actuated piston 60 is suspended from frame 59. Rod 61 extends out of piston 60. Linkage 62 contains a plurality of universal joints and connects rod 61 to plate 58. It is apparent that piston 60, when actuated, functions to move plate 58 in substantially lateral directions with respect to press 51. It should be noted that linkage 62 with its universal joints will allow movement of plate 58 in the direction which is generally transverse to the direction of movement of sheet material 22.

Fluid actuated piston 63 depends from upper portion 52 of press 51 and has rod 64 extending outwardly therefrom. Link 65 is pivotally connected at one end to rod 64 and at its other end to one leg of L-shaped arm 66. L-shaped arm 66 is pivotally connected at the juncture of its legs to support member 67 which is secured to block 55 near one end thereof. A pin 68 depends from L-shaped arm 66 near the outer end of its free leg. Pin 68 extends into slot 69 of block 70 which is secured to plate 58. Pin 68 is in sliding relationship with respect to slot 69. Near the other end of block 55 on the same side thereof, is located an L-shaped arm 71, support 72, pin 73, slot 74, and block 75. These elements are similar to and located with respect to each other in the same manner as L-shaped arm 66, support 67, pin 68, slot 69, and block 70. Cross link 76 is pivotally connected at one end to the outer end of the pinless leg of arm 71. The other end of link 76 is pivotally connected to L-shaped arm 66 between its connection with support 67 and link 65. Therefore, when piston 63 is actuated, plate 58 will be moved arcuately in the general direction of movement of sheet material 22.

Thus, it is apparent that plate 58 may be adjusted in any direction by pistons 59 and 63 through their associated linkages within the limits imposed by block 55, tongues 56, and loops 57.

Referring now to FIGURES 7 to 11, there is shown the registration sensing apparatus 77. The registration sensing apparatus has a head 78 which is adjustably mounted on block 75 by means of linkage 79. A pair of photoelectric cells 80 and 81 depend from head 78. Photocells 80 and 81 are adjustably mounted on head 78. Photocell 80 is positioned in rough alignment with the side edge 36 of recess 34. Photocell 81 is positioned so that it will be in rough alignment with leading edge 35 of recess 34 when recess 34 is located thereunder. It is to be noted that the sheet material 22 will not be far out of line, if at all, at this point because said sheet material has just been disengaged from the aligning pins 41 and because windup roll 88 is in general alignment with the rest of the apparatus.

Underlying photocells 80 and 81 are perforate, sheet material guide plates 82 and 83. Plates 82 and 83 are secured to head 78 in spaced relationship to each other and parallel to sheet material 22. Plates 82 and 83 have aligned, perforate areas 84 and 85 which underlie photocells 80 and 81. Light source 86 underlies plate 83 and is secured to head 78. Sheet material 22 passes between plates 82 and 83. Registration apparatus 77 is adjustably mounted on block 75 and positioned so that during the periods of nonmovement of sheet material 22, one recess 34 therein will be in rough alignment with the photocells 80 and 81 as described above. Photocell 80 senses the alignment of side edge 36 by receiving light passing through recess 34 and perforate areas 84 and 85 from light source 86. Photocell 80 controls the general, lateral alignment of plate 51 with the pattern on sheet material 22 through piston 60 and its associated linkages. Similarly, photocell 81 senses the position of leading edge 35 by receiving the light passing thereby from light source 86. Photocell 81 controls the longitudinal alignment of plate 58 through piston 63 and its associated linkages. Photocells 80 and 81 sense and control movement of pistons 60 and 63 until plate 58 is properly aligned with the pattern in sheet material 22 as determined by the location of the reference leading and side edges 35 and 36. After the embossing plate 51 is properly aligned and registered with the pattern in sheet material 22, suitable control means to be described below will cause the reciprocable lower portion 53 of press 51 to be actuated to press the sheet material against the embossing plate 58, thereby embossing and consolidating the granular material on the sheet material.

After the embossing and consolidating steps have been completed, reciprocable lower portion 53 will retract, thereby freeing sheet material 22 for further movement over idler roller 87 to windup roll 88 which is rotated by suitable drive means.

Referring now to FIGURE 13, there is shown a control circuit which may be used with the above-described components. All units are connected to a master control 89 which sequentially and automatically controls the intermittent operation. It is noted that photocells 80 and 81 are connected to master control 89. Master control 89 is usually set up so that punch 31, stencils 46 to 49, and lower portion 53 of press 51 are actuated simultaneously. During the time that these elements are in operation, sheet material 22 will be stationary. When the stenciling, punching, embossing and consolidating operations are completed, the master control unit 89 will deactivate stencils 46 to 49 and punch 31 and actuate drive means 45 and windup roll 88 to pull a predetermined length of sheet material through the operation. This predetermined length will usually be equal to the length which has just been embossed and consolidated so that the next succeeding unembossed and unconsolidated portion of sheet material 22 will underlie the press 51 in preparation for the next pressing and consolidating operation. As the recesses 34 are punched in the sheet material 22 the same distance apart and bear a given constant relationship to the stencil repeat, predetermined length of material move, and location of photocells 80 and 81, each time sheet material 22 is moved said predetermined length, a recess will underlie and be in rough alignment with photocells 80 and 81 and light source 86 whereupon master control unit 89 may actuate said photocells and light source. These elements will then send signals to master control unit 89 with regard to the misalignment of the embossing plate 58 with respect to the reference recess 34 in sheet material 22. Master control 89 will actuate valves 90 and 91 in fluid lines 92 and 93 leading to piston 63 and valves 94 and 95 in lines 96 and 97 leading from a suitable source of pressure fluid such as oil, for example, to piston 60. Pistons 60 and 63 will continue to be actuated by and in response to photocells 80 and 81 until said photocells 80 and 81 are properly aligned with registration recess 34 at which time the embossing plate 58 will also be properly aligned and registered with the pattern in sheet material 22, since photocells 80 and 81 are mounted on block 75 for movement with plate 58 and are located in predetermined relationship thereto. When the plate 58 is properly aligned with the pattern, the master control 89 will prevent further movement of the embossing plate by de-energizing the photocells 80 and 81, and will actuate the lower portion 53 of press 51 so that it will push sheet material 22 into engagement with embossing plate 58 thereby embossing and consolidating the pattern on said sheet material. At this same time, punch 31 and stencils 46 to 49 are actuated to perform their respective functions. After these operations have been completed, lower portion 53 will retract and drive means 45 and windup roll 88 will be actuated to index sheet material 22 a given distance in preparation for another cycle.

It is to be understood that the pattern of granular material deposited on sheet material 22 by stencils 46 to 49 usually will be of the repeating type. The stencils may be set up so that there may be a single repeat or plural repeats of the pattern in a given length of sheet material equal to the length of each move of said sheet material which usually will be constant for a given setup. If desired the stencils may be set up so that the pattern will repeat itself only in a given length of the sheet material which is greater than the length of each move of said sheet material. In any event, the length between repeats should be constant. Similarly, the length of move of the material should be constant regardless of the relationship between it and the length between repeats. Further, the dimensions of the embossing plate should be sufficient to emboss and consolidate at least one complete pattern or a whole multiple thereof. The recesses 34 must bear a constant relationship to the pattern repeats, length of material move, photocells, and embossing plates so that one of said recesses 34 always will be located in rough alignment with photocells 80 and 81 during periods of non-movement of sheet material 22 and so that when photocells 80 and 81 cause plate 58 to be positioned with respect to one of the recesses 34, the embossing plate 58 will be properly aligned with the pattern of granular material on the sheet material 22.

One example of the relative positioning of elements will now be described. The stencils may be set so that a complete pattern will be placed on the sheet material 22 along a length thereof which may be equal to the length of move of said material. Thus, each time the sheet material is moved or indexed a repeat pattern will be placed thereon in adjacent and continuous relationship to the original pattern deposited on the sheet material. If the length of move is 30 inches, for example, the pattern of granular material will repeat itself every 30 inches. Punch mechanism 31 may be set up so that punch 32 will create a recess 34 in sheet material 22 every 30 inches at a point which is located at a constant distance from some point on the sheet material upon which the pattern will be placed. If the lines between repeats are located at points on the sheet material 22 which are 30 inches apart as stated above, the punch mechanism may be adjusted so that recess 34 may be placed in the sheet material 22 at a point which will lie 6 inches ahead of the repeat line which will later appear between each of the stenciled patterns on the sheet material 22. The embossing plate 58 in this example should be capable of embossing a full 30 inches in length of pattern and be located on the downstream side of base 38 in rough alignment with a completely stenciled pattern during periods of rest of the sheet material 22. The registration sensing apparatus 77 may be set so that the photocells 80 and 81 are 6 inches in front of plate 58 and in line with the side edge thereof which overlies the recessed edge of sheet material 22. However, the photocells 80 and 81 are set so that they will bear the same relationship to the pattern on the embossing plate as the recess 34 underlying the photocells 81 and 82 bears to the pattern on the sheet material 22 underlying the embossing plate 58. It follows that when the photocells 80 and 81 cause themselves to be aligned with the recess 34, the embossing plate 58 which is fixed with respect to the photocells 80 and 81 and moved thereby will be properly aligned and registered with the pattern on the sheet material 22.

It will be apparent that many other combinations of relationships of distances between elements and repeats may be set up to achieve the same result and that the device of the present invention is not limited thereto. By way of further example, the pattern may repeat itself several times during a single length of material move. In this case, the embossing plate may have an equal number of repeats. The positions of the punch and photocells with respect to the patterns may be varied as long as the recesses in the sheet material which underlie the photocells during periods of non-movement of the sheet material bear the same relationship to the patterns on said sheet material as the photocells bear to the pattern on the embossing plate. It is also contemplated that the embossing plate may have a different number of patterns than the number of patterns on the sheet material, in which case the reciprocation of the press would have to be properly adjusted with respect to the length of move to insure that all repeats are embossed. It is noted that portions of repeats may be used on an individual embossing plate.

It is to be understood that the various dimenisons, components, shapes, and sizes of elements may be varied. Further, the apparatus of the present invention may be used in the manufacture of many types of sheet material including sheet material formed partially or wholly of thermoplastic and/or thermosetting materials.

Various modifications of the present invention will occur to those skilled in the art without departing from the spirit and scope thereof as defined in the claims.

I claim:
1. Apparatus for making sheet material comprising means to supply sheet material, means to provide a design on said sheet material, means to provide a reference on said sheet material in predetermined relationship to said design thereon, means for embossing said design, means for moving said embossing means with respect to said design on said sheet material, means for moving said sheet material intermittently through said design providing means, said reference providing means and said embossing means, registration means associated with said means for moving said embossing means to align said embossing means with said design prior to the embossing thereof, said registration means including photocell means for sensing the alignment of said reference, and control means to cause said material moving means to intermittently terminate movement of said sheet material, said photocell means to be energized during periods of non-movement of said sheet material, said means for moving said embossing means to align said embossing means with said design in response to said photocell means, said embossing means to emboss said design, and said material moving means to again move said sheet material so that at least one other portion of said design is in rough alignment with said embossing means whereupon a similar sequence of aligning and embossing operations may take place.

2. Apparatus according to claim 1 wherein said means to move said embossing means include fluid operated piston and cooperating linkage means.

3. Apparatus according to claim 1 wherein said design providing means include stencil means which deposit fusible material on said sheet material in repeating patterns and means to consolidate said fusible material on said sheet material.

4. Apparatus according to claim 1 wherein said means to provide a reference provide a lateral reference portion and a longitudinal reference portion.

5. Apparatus according to claim 4 wherein said photocell means include first photocell means which are sensitive to said lateral reference portion and second photocell means which are sensitive to said longitudinal reference portion.

6. Apparatus according to claim 5 wherein said control means energize said first and said second photocell means until said embossing means are aligned with said patterns.

7. Apparatus for making sheet material comprising means to supply sheet material, means to provide a design on said sheet material, means to provide a reference on said sheet material in predetermined relationship to said design thereon, means for embossing said design, means for moving said embossing means with respect to said design on said sheet material, means for moving said sheet material intermittently through said design providing means, said reference providing means and said embossing means, registration means associated with said means for moving said embossing means to align said embossing means with said design prior to the embossing thereof, said registration means including means for sensing the alignment of said reference, and control means to cause said material moving means to intermittently terminate movement of said sheet material, said alignment sensing means to be energized during periods of non-movement of said sheet material, said means for moving said embossing means to align said embossing means with said design in response to said alignment sensing means, said embossing means to emboss said design, and said material moving means to again move said sheet material so that at least one other portion of said design is in rough alignment with said embossing means whereupon a similar sequence of aligning and embossing operations may take place.

References Cited

UNITED STATES PATENTS

| | | | |
|---|---|---|---|
| 2,438,787 | 3/1948 | Nicholas | 118—8 |
| 2,452,959 | 11/1948 | Sidebotham | 101—114 |
| 2,591,240 | 4/1952 | Ditto et al. | 118—101 |
| 2,906,240 | 9/1959 | Gladwell | 118—236 |
| 3,227,549 | 1/1966 | Ullrich et al. | |

CHARLES A. WILLMUTH, *Primary Examiner.*

L. G. MACHLIN, *Assistant Examiner.*